United States Patent
Bae

(10) Patent No.: US 8,774,219 B2
(45) Date of Patent: Jul. 8, 2014

(54) METHOD AND APPARATUS FOR TRANSMITTING/RECEIVING MULTIPLEXED PACKET STREAM OVER SINGLE TRANSMISSION CHANNEL

(75) Inventor: Seong-Jun Bae, Daejeon (KR)

(73) Assignee: Electronics and Telecommunications Research Institute, Daejeon (KR)

( * ) Notice: Subject to any disclaimer, the term of this patent is extended or adjusted under 35 U.S.C. 154(b) by 256 days.

(21) Appl. No.: 13/181,705

(22) Filed: Jul. 13, 2011

(65) Prior Publication Data
US 2012/0014396 A1 Jan. 19, 2012

(30) Foreign Application Priority Data
Jul. 14, 2010 (KR) .................. 10-2010-0067821

(51) Int. Cl.
*H04J 3/24* (2006.01)
(52) U.S. Cl.
USPC .................................... 370/474; 370/471
(58) Field of Classification Search
USPC .................... 370/474, 310.01, 349
See application file for complete search history.

(56) References Cited

U.S. PATENT DOCUMENTS

| 2005/0100022 A1* | 5/2005 | Ramprashad | 370/395.42 |
| 2005/0201379 A1* | 9/2005 | Zhang et al. | 370/395.1 |
| 2007/0258699 A1* | 11/2007 | Kikuchi et al. | 386/95 |
| 2009/0178087 A1* | 7/2009 | Menn et al. | 725/86 |

FOREIGN PATENT DOCUMENTS

| KR | 1020030020968 A | 3/2003 |
| WO | WO02100067 A1 | 12/2002 |

OTHER PUBLICATIONS

Seong-Jun Bae, Layering of MMT Headers for Packet Delivery, Proposal to International Organisation for Standardisation ISO/IEC JTC1/SC29/WG11 Coding of Moving Pictures and Audio MPEG2011/M20398, Jul. 2010, Torino, Italy.

* cited by examiner

*Primary Examiner* — Abdullah Riyami
*Assistant Examiner* — Brian Cox
(74) *Attorney, Agent, or Firm* — William Park & Associates, Patent Ltd.

(57) ABSTRACT

A method for transmitting a main packet stream generated by multiplexing a plurality of substreams, using a single transmission channel, includes packeting each of the plurality of substreams and generating substream packets; allocating substream sequence information to the substream packets according to a sequence in which the substream packets are generated; allocating main packet stream sequence information to the substream packets according to a sequence in which the substream packets are inputted; and multiplexing inputted substream packets and generating the main packet stream.

20 Claims, 9 Drawing Sheets

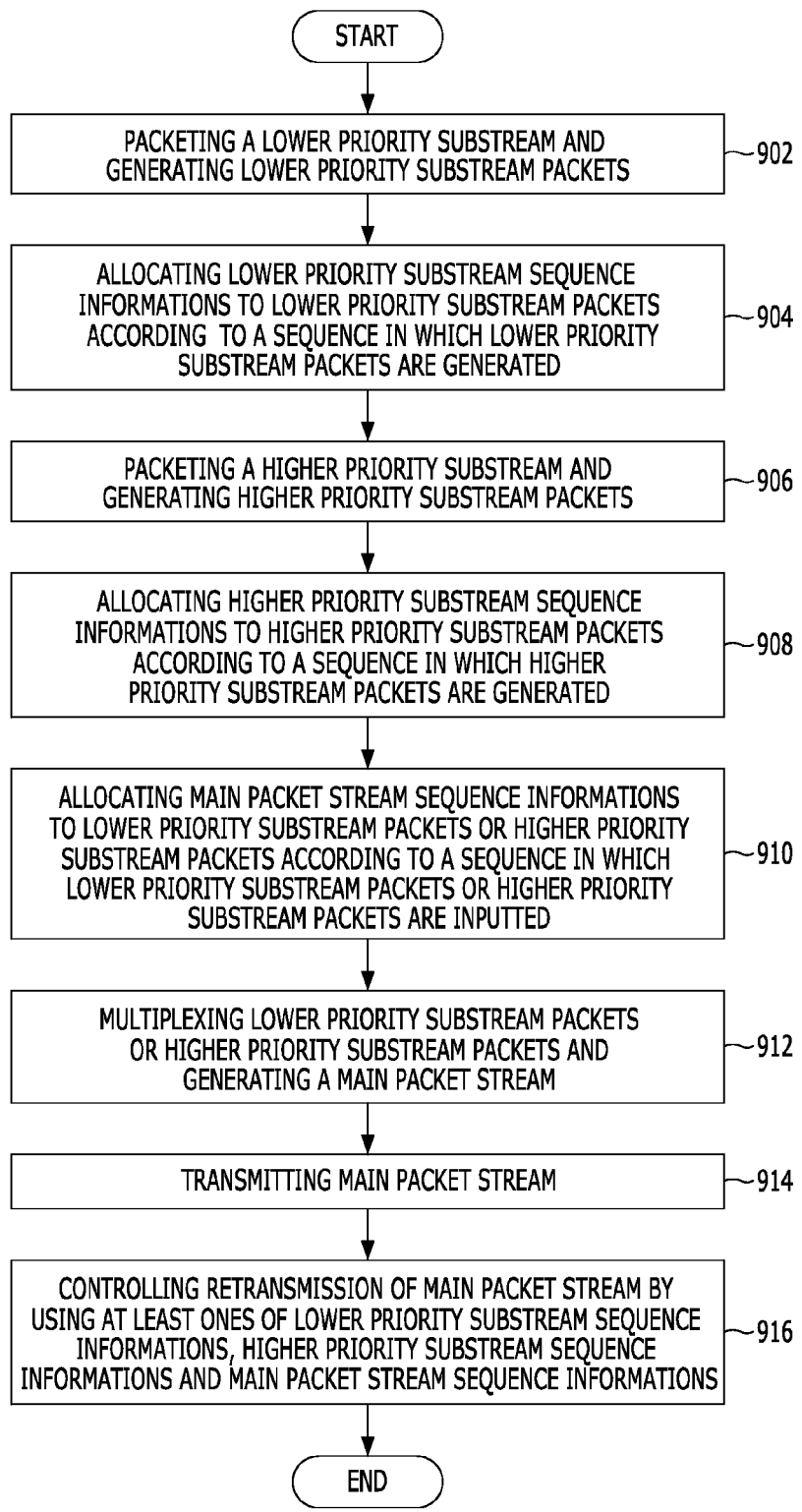

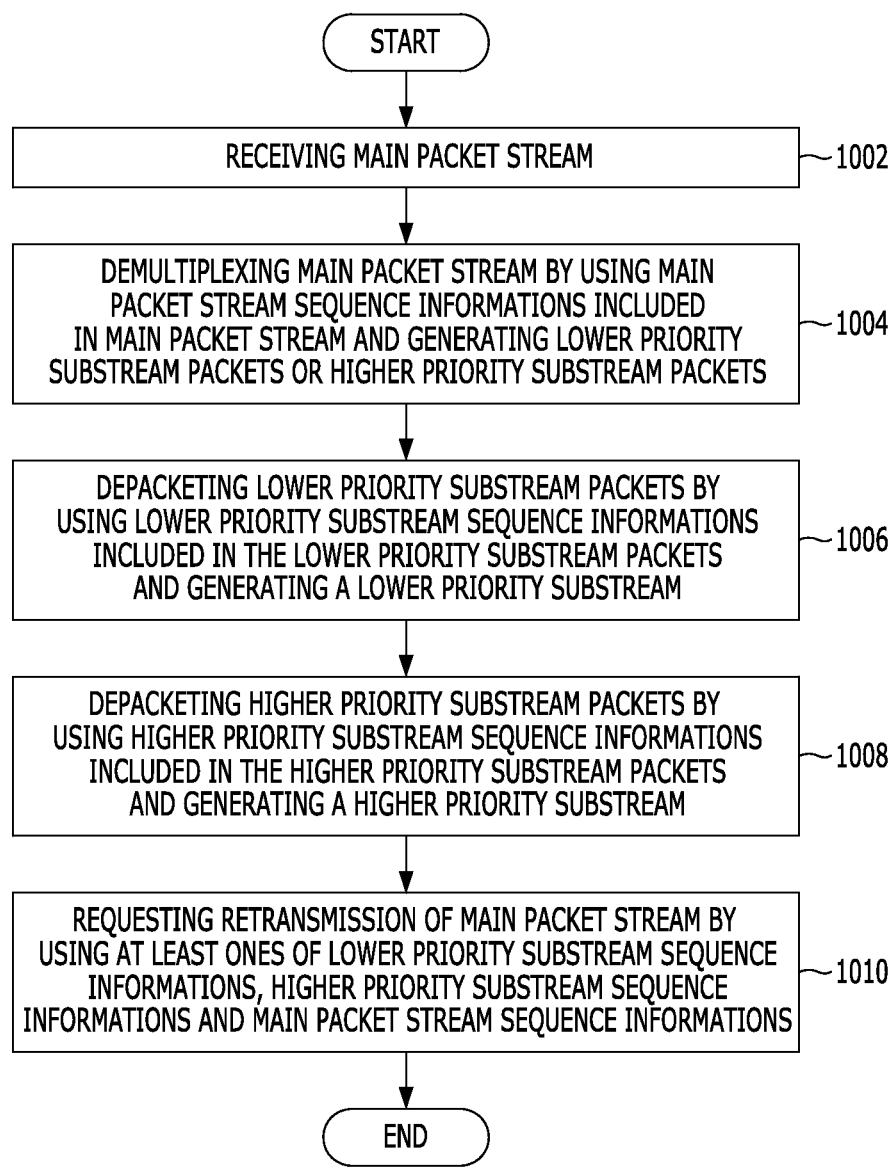

METHOD AND APPARATUS FOR TRANSMITTING/RECEIVING MULTIPLEXED PACKET STREAM OVER SINGLE TRANSMISSION CHANNEL

CROSS-REFERENCE TO RELATED APPLICATION

The present application claims priority of Korean Patent Application No. 10-2010-0067821, filed on Jul. 14, 2010, which is incorporated herein by reference in its entirety.

BACKGROUND OF THE INVENTION

1. Field of the Invention

Exemplary embodiments of the present invention relate to a method and an apparatus for transmitting and receiving a multiplexed packet stream through a single transmission channel.

2. Description of Related Art

With the popularization of an IP network, media streaming for transmitting audio/video media streams through an IP network has been widely used. Currently, according to a media streaming transmission scheme widely used in an IP network, separate port numbers are assigned to respective audio or video streams, and the respective streams are transmitted through completely independent transmission channels.

However, it is a frequent occurrence that the number of audio and video streams constituting one contents presentation such as a 3D video increases. Here, the contents presentation stands for one contents consumption unit that is finally consumed by a user, and is configured by audio and video streams, a caption information stream synchronized with a specified time and a metadata stream synchronized with an audio/video. In this case, independent port numbers should be respectively allocated to audio streams, video streams and data streams which constitute one contents presentation, and according to this fact, independent transmission channels based on a number of port numbers are needed.

Also, as the number of contents transmitted to a terminal of a contents consumer increases as in an IPTV-based application for providing a plurality of channels, the number of port numbers needed for providing a service markedly increases.

In order to prevent waste of port numbers as limited resources, a method has been used in which signaling data for initializing and controlling a plurality of audio data, video data, data streams and contents presentations are multiplexed and transmitted to a single transmission channel using one port number. At this time, packet headers with identifiers (IDs) for identifying respective streams are added to a multiplexed packet stream. Hereafter, respective audio, video and data streams constituting a multiplexed packet stream will be defined as substreams.

In the case where a plurality of substreams are multiplexed and transmitted through one transmission channel, substreams with different transmission characteristics or requirements may be multiplexed as one packet stream. For example, since a signaling data substream includes initialization information of a video decoder, all packets of the signaling data substream should be transmitted without the loss of even one packet. Conversely, in the case of a video substream, it is the norm that, even when packet loss occurs to some extent, a serious problem likely to interrupt an entire contents reproduction system is not caused except momentary deterioration of image quality. Rather, in this case, if it is attempted to recover packet loss through retransmission, a delay may occur in the reception of video data.

As a consequence, it is general that respective substreams included in a multi-packet stream, which share one port, have different characteristics with respect to packet loss. In other words, in the multi-packet stream, various kinds of substreams exist from an error-free substream in which no packet loss should be ensured to a substream which should not undergo a packet loss level of a general transmission channel.

Accordingly, in order to achieve a successful single port-based contents presentation using a multi-packet stream, methods for recovering packet should be able to be selected for respective substreams. Namely, while perfect retransmission should be possible for all packet loss in the case a substream in which no packet loss should be ensured, no recovery should be tried for packet loss and transmission should be performed within a preset time in the case of another substream. Further, in a specified substream, recovery for packet loss may be tried within a range not causing a delay longer than a predetermined level between a transmitting end and a receiving end.

As a result, in the case of transmitting a multi-packet stream generated by multiplexing a plurality of substreams, through one transmission channel, it should be possible to select different error correction schemes for respective substreams.

SUMMARY OF THE INVENTION

Embodiments of the present invention are directed to a method and an apparatus which can realize differentiated error correction functions for respective substreams included in a multi-packet stream when transmitting and receiving the multi-packet stream through a single transmission channel.

Other objects and advantages of the present invention can be understood by the following description, and become apparent with reference to the embodiments of the present invention. Also, it is obvious to those skilled in the art to which the present invention pertains that the objects and advantages of the present invention can be realized by the means as claimed and combinations thereof.

In accordance with an embodiment of the present invention, a method for transmitting a main packet stream generated by multiplexing a plurality of substreams, using a single transmission channel, includes: packeting each of the plurality of substreams and generating substream packets; allocating substream sequence information to the substream packets according to a sequence in which the substream packets are generated; allocating main packet stream sequence information to the substream packets according to a sequence in which the substream packets are inputted; and multiplexing inputted substream packets and generating the main packet stream.

In accordance with another embodiment of the present invention, a method for receiving a main packet stream generated by multiplexing a plurality of substreams, using a single transmission channel, includes: receiving the main packet stream; demultiplexing the main packet stream using substream identifiers included in the main packet stream, and generating substream packets; and depacketing the substream packets using substream sequence information included in the main packet stream, and generating the plurality of substreams.

In accordance with another embodiment of the present invention, an apparatus for transmitting a main packet stream generated by multiplexing a plurality of substreams, using a single transmission channel, includes: a packeting unit configured to packet each of the plurality of substreams, generate substream packets, and allocate substream sequence information to the substream packets according to a sequence in which the substream packets are generated; and a multiplexing unit configured to allocate main packet stream sequence information to the substream packets according to a sequence in which the substream packets are inputted, multiplex inputted substream packets, and generate the main packet stream.

In accordance with another embodiment of the present invention, an apparatus for receiving a main packet stream generated by multiplexing a plurality of substreams, using a single transmission channel, includes: an input unit configured to receive the main packet stream; a demultiplexing unit configured to demultiplex the main packet stream using substream identifiers included in the main packet stream, and generate substream packets; and a depacketing unit configured to depacket the substream packets using substream sequence information included in the main packet stream, and generate the plurality of substreams.

In accordance with another embodiment of the present invention, a method for transmitting a main packet stream includes: packeting a lower priority substream and generating lower priority substream packets; allocating lower priority substream sequence information to the lower priority substream packets according to a sequence in which the lower priority substream packets are generated; packeting a higher priority substream and generating higher priority substream packets; allocating higher priority substream sequence information to the higher priority substream packets according to a sequence in which the higher priority substream packets are generated; allocating main packet stream sequence information to the lower priority substream packets or the higher priority substream packets according to a sequence in which the lower priority substream packets or the higher priority substream packets are inputted; multiplexing the lower priority substream packets or the higher priority substream packets and generating a main packet stream; transmitting the main packet stream; and controlling retransmission of the main packet stream using at least one of the lower priority substream sequence information, the higher priority substream sequence information and the main packet stream sequence information.

In accordance with another embodiment of the present invention, a method for receiving a main packet stream includes: receiving a main packet stream; demultiplexing the main packet stream using main packet stream sequence information included in the main packet stream, and generating lower priority substream packets or higher priority substream packets; depacketing the lower priority substream packets using lower priority substream sequence information included in the lower priority substream packets, and generating a lower priority substream; depacketing the higher priority substream packets using higher priority substream sequence information included in the higher priority substream packets, and generating a higher priority substream; and requesting retransmission of the main packet stream using at least one of the lower priority substream sequence information, the higher priority substream sequence information and the main packet stream sequence information.

In accordance with another embodiment of the present invention, an apparatus for transmitting a main packet stream includes: a lower priority substream packeting unit configured to packet a lower priority substream and generate lower priority substream packets, and allocate lower priority substream sequence information to the lower priority substream packets according to a sequence in which the lower priority substream packets are generated; a higher priority substream packeting unit configured to packet a higher priority substream and generate higher priority substream packets, and allocate higher priority substream sequence information to the higher priority substream packets according to a sequence in which the higher priority substream packets are generated; a multiplexing unit configured to allocate main packet stream sequence information to the lower priority substream packets or the higher priority substream packets according to a sequence in which the lower priority substream packets or the higher priority substream packets are inputted, and multiplex the lower priority substream packets or the higher priority substream packets and generate a main packet stream; and a transmission unit configured to transmit the main packet stream; and a control unit configured to control retransmission of the main packet stream using at least one of the lower priority substream sequence information, the higher priority substream sequence information and the main packet stream sequence information.

In accordance with another embodiment of the present invention, an apparatus for receiving a main packet stream includes: a reception unit configured to receive a main packet stream; a demultiplexing unit configured to demultiplex the main packet stream using main packet stream sequence information included in the main packet stream, and generate lower priority substream packets or higher priority substream packets; a lower priority substream depacketing unit configured to depacket the lower priority substream packets using lower priority substream sequence information included in the lower priority substream packets, and generate a lower priority substream; a higher priority substream depacketing unit configured to depacket the higher priority substream packets using higher priority substream sequence information included in the higher priority substream packets, and generate a higher priority substream; and a control unit configured to request retransmission of the main packet stream using at least one of the lower priority substream sequence information, the higher priority substream sequence information and the main packet stream sequence information.

BRIEF DESCRIPTION OF THE DRAWINGS

FIG. 9 is a flow chart showing a method for transmitting a main packet stream in accordance with another embodiment of the present invention.

FIG. 10 is a flow chart showing a method for receiving a main packet stream in accordance with another embodiment of the present invention.

DESCRIPTION OF SPECIFIC EMBODIMENTS

Figure 1:
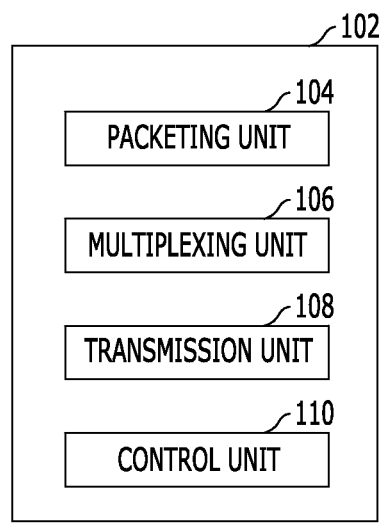
FIG. 1 is a diagram showing the configuration of a main packet stream transmission apparatus in accordance with an embodiment of the present invention.

Exemplary embodiments of the present invention will be described below in more detail with reference to the accompanying drawings. The present invention may, however, be embodied in different forms and should not be construed as limited to the embodiments set forth herein. Rather, these embodiments are provided so that this disclosure will be thorough and complete, and will fully convey the scope of the present invention to those skilled in the art. Throughout the disclosure, like reference numerals refer to like parts throughout the various figures and embodiments of the present invention.

The present invention relates to a method and an apparatus for transmitting and receiving a multi-packet stream generated by multiplexing a plurality of substreams, through a single transmission channel. In the following description, the term, 'main packet stream' is used as having the same meaning as a multi-packet stream. That is to say, a plurality of substreams are respectively packeted into substream packets, and a main packet stream is generated by multiplexing the packets of the plurality of substreams.

FIG. 1 is a diagram showing the configuration of a main packet stream transmission apparatus in accordance with an embodiment of the present invention.

Referring to FIG. 1, the main packet stream transmission apparatus 102 includes a packeting unit 104, a multiplexing unit 106, a transmission unit 108, and a control unit 110.

The packeting unit 104 receives a plurality of substreams to transmit. Then, the packeting unit 104 packets each of the plurality of substreams, generates substream packets, and allocates substream sequence information to respective substream packets according to a sequence in which the substream packets are generated. The substream sequence information as information indicating the sequence in which the substream packets are generated is used when a reception apparatus depackets sequentially the substream packets. Also, the substream sequence information is used to determine whether or not a reception error occurs, that is, corresponding packets are properly received in a depacketing process.

The packeting unit 104 may allocate substream identifiers for differentiating the plurality of substreams, to the generated substream packets. The substream identifiers may be used to differentiate packets of respective substreams when the reception apparatus demultiplexes a main packet stream generated by multiplexing the plurality of substream packets.

The multiplexing unit 106 receives the substream packets generated by the packeting unit 104. Then, the multiplexing unit 106 allocates main packet stream sequence information to the substream packets according to a sequence in which the substream packets are received. The main packet stream sequence information as information indicating the reception sequence of the substream packets constituting the main packet stream is used when the reception apparatus demultiplexes sequentially the main packet stream. Also, the main packet stream sequence information is used to determine whether or not a reception error occurs, that is, the packets included in the main packet stream are properly received in a demultiplexing process. Finally, the multiplexing unit 106 multiplexes the received substream packets and generates the main packet stream.

The transmission unit 108 transmits the main packet stream generated by the multiplexing unit 106, to the reception apparatus.

Meanwhile, in the case where retransmission of a substream packet is necessary due to the occurrence of an error, etc. while the reception apparatus depackets substream packets, the reception apparatus may transmit a substream retransmission request including the substream sequence information of the substream packet required to be retransmitted, to the transmission apparatus. The control unit 110 receives the substream retransmission request including the substream sequence information of the substream packet required to be retransmitted, from the reception apparatus. Then, the control unit 110 requests the multiplexing unit 106 to multiplex the substream packet corresponding to the substream sequence information of the substream packet required to be retransmitted. The multiplexing unit 106 multiplexes the substream packet corresponding to the substream sequence information of the substream packet required to be retransmitted, in response to the request from the control unit 110. The multiplexed substream packet is transmitted to the reception apparatus through the transmission unit 108.

Also, in the case where retransmission of a substream packet is necessary due to the occurrence of an error, etc. while the reception apparatus demultiplexes the received main packet stream, the reception apparatus may transmit a main packet stream retransmission request including the main packet stream sequence information of the substream packet required to be retransmitted, to the transmission apparatus. The control unit 110 receives the main packet stream retransmission request including the main packet stream sequence information of the substream packet required to be retransmitted, from the reception apparatus. Then, the control unit 110 requests the multiplexing unit 106 to multiplex the substream packet corresponding to the main packet stream sequence information of the substream packet required to be retransmitted. The multiplexing unit 106 multiplexes the substream packet corresponding to the main packet stream sequence information of the substream packet required to be retransmitted, in response to the request from the control unit 110. The multiplexed substream packet is transmitted to the reception apparatus through the transmission unit 108.

Figure 2:
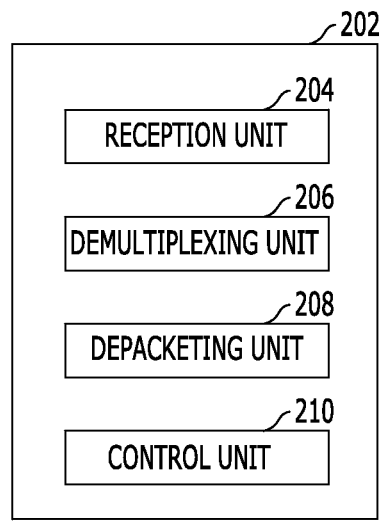
FIG. 2 is a diagram showing the configuration of a main packet stream reception apparatus in accordance with another embodiment of the present invention.

FIG. 2 is a diagram showing the configuration of a main packet stream reception apparatus in accordance with another embodiment of the present invention.

Referring to FIG. 2, the main packet stream reception apparatus 202 includes a reception unit 204, a demultiplexing unit 206, a depacketing unit 208, and a control unit 210.

The reception unit 204 receives the main packet stream transmitted from the main packet stream transmission apparatus. The main packet stream generated by multiplexing the plurality of substreams is received through a single transmission channel.

The demultiplexing unit 206 demultiplexes the main packet stream by using the substream identifiers included in the main packet stream received by the reception unit 204. Since the main packet stream has the plurality of substream packets multiplexed therein, the substream identifiers included in the main packet stream are used to differentiate the respective substream packets. According to this fact, the demultiplexing unit 206 generates the packets of the respective substreams, by using the substream identifiers.

The depacketing unit 208 depackets the substream packets by using the substream sequence information included in the main packet stream. As described above, the substream sequence information is information allocated to the respective substream packets according to the sequence in which the substream packets are generated. Accordingly, the depacketing unit 208 may generate the plurality of substreams by depacketing the substream packets using the substream sequence information.

Meanwhile, there may be a case in which retransmission of a substream packet is necessary due to the occurrence of an error, etc. while the demultiplexing unit 206 demultiplexes the main packet stream. The control unit 210 checks the occurrence of an error in the main packet stream by using main packet stream sequence information included in the main packet stream. The control unit 210 generates a main packet stream retransmission request for requesting the retransmission of the substream packet in which the reception error occurs, according to the reception error checking result. The generated main packet stream retransmission request is transmitted to the transmission apparatus and is used in the retransmission of the corresponding substream packet.

Also, there may be a case in which retransmission of a substream packet is necessary due to the occurrence of an error, etc. while the depacketing unit 208 depackets the substream packets. The control unit 210 checks the occurrence of an error in the substream packet by using substream sequence information included in the substream packet. The control unit 210 generates a substream packet retransmission request for requesting the retransmission of the substream packet in which the reception error occurs, according to the reception error checking result. The generated substream packet retransmission request is transmitted to the transmission apparatus and is used in the retransmission of the corresponding substream packet.

Figure 3:
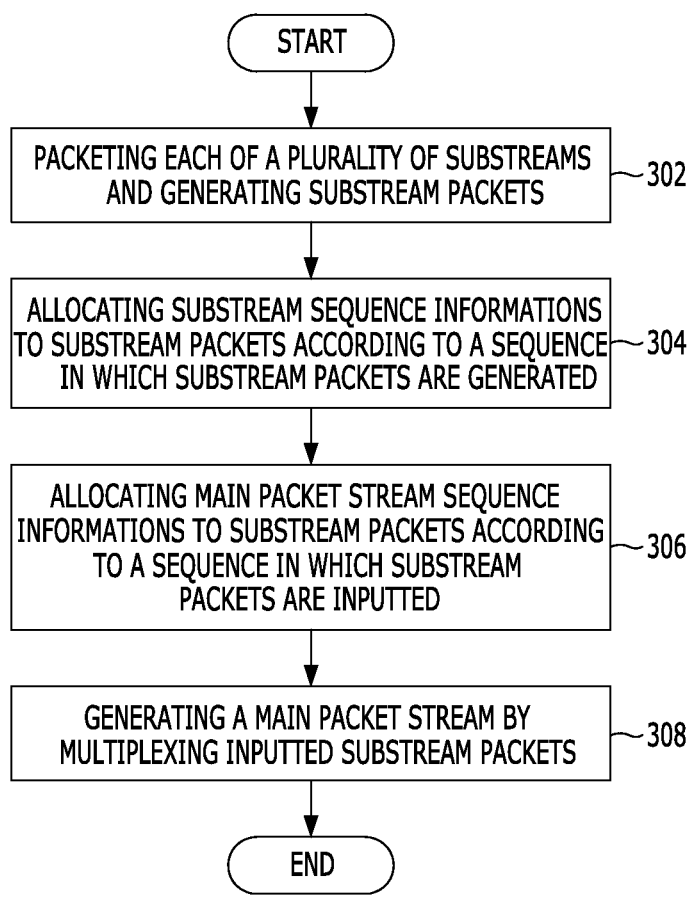
FIG. 3 is a flow chart showing a method for transmitting a main packet stream in accordance with another embodiment of the present invention.

FIG. 3 is a flow chart showing a method for transmitting a main packet stream in accordance with another embodiment of the present invention.

First, by packeting each of a plurality of substreams, substream packets 302 are generated (302). Then, according to a sequence in which the substream packets are generated, substream sequence information is allocated to the substream packets (304). The substream sequence information as information indicating the sequence in which the substream packets are generated is used when a reception apparatus depackets sequentially the substream packets. Also, the substream sequence information is used to determine whether or not a reception error occurs, that is, corresponding packets are properly received in a depacketing process.

While not shown in FIG. 3, substream identifiers for differentiating the plurality of substreams may be allocated to the generated substream packets. The substream identifiers may be used to differentiate packets of respective substreams when the reception apparatus demultiplexes a main packet stream generated by multiplexing the plurality of substream packets.

Next, according to a sequence in which the substream packets are received, main packet stream sequence information is allocated to the substream packets (306). The main packet stream sequence information as information indicating the reception sequence of the substream packets constituting the main packet stream is used when the reception apparatus demultiplexes sequentially the main packet stream. Also, the main packet stream sequence information is used to determine whether or not a reception error occurs, that is, the packets included in the main packet stream are properly received in a demultiplexing process.

Then, by multiplexing the received substream packets, the main packet stream is generated (308). The generated main packet stream may be transmitted to the reception apparatus through a transmission unit.

Meanwhile, in the case where retransmission of a substream packet is necessary due to the occurrence of an error, etc. while the reception apparatus depackets the substream packets, the reception apparatus may transmit a substream retransmission request including the substream sequence information of the substream packet required to be retransmitted, to the transmission apparatus. Accordingly, while not shown in FIG. 3, the substream retransmission request including the substream sequence information of the substream packet required to be retransmitted may be received from the reception apparatus. Then, multiplexing of the substream packet corresponding to the substream sequence information of the substream packet required to be retransmitted is requested. The substream packet corresponding to the substream sequence information of the substream packet required to be retransmitted is multiplexed in response to the request. The multiplexed substream packet is transmitted to the reception apparatus through the transmission unit.

Also, in the case where retransmission of a substream packet is necessary due to the occurrence of an error, etc. while the reception apparatus demultiplexes the received main packet stream, the reception apparatus may transmit a main packet stream retransmission request including the main packet stream sequence information of the substream packet required to be retransmitted, to the transmission apparatus. Accordingly, while not shown in FIG. 3, the main packet stream retransmission request including the main packet stream sequence information of the substream packet required to be retransmitted may be received from the reception apparatus. Then, multiplexing of the substream packet corresponding to the main packet stream sequence information of the substream packet required to be retransmitted is requested. The substream packet corresponding to the main packet stream sequence information of the substream packet required to be retransmitted is multiplexed in response to the request. The multiplexed substream packet is transmitted to the reception apparatus through the transmission unit.

Figure 4:
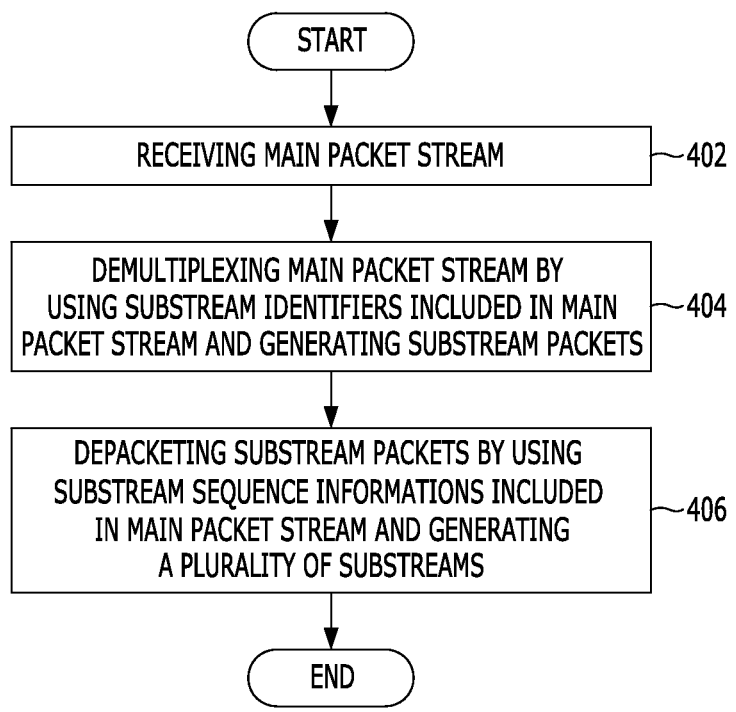
FIG. 4 is a flow chart showing a method for receiving a main packet stream in accordance with another embodiment of the present invention.

FIG. 4 is a flow chart showing a method for receiving a main packet stream in accordance with another embodiment of the present invention.

First, a main packet stream transmitted from a main packet stream transmission apparatus is received (402). This main packet stream generated by multiplexing a plurality of substreams is received through a single transmission channel.

Then, by using the substream identifiers included in the received main packet stream, the main packet stream is demultiplexed and substream packets are generated (404). A plurality of substream packets are multiplexed into the main packet stream, and the substream identifiers included in the main packet stream are used to identify the respective substream packets. That is to say, the respective substream packets are generated using the substream identifiers.

Next, by depacketing the substream packets using the substream sequence information included in the main packet stream, a plurality of substreams are generated (406). As described above, the substream sequence information is information which is allocated to the respective substream packets according to a sequence in which the substream packets are generated. Thus, by depacketing the substream packets using the substream sequence information, the plurality of substreams may be generated.

Meanwhile, there may be a case in which retransmission of a substream packet is necessary due to the occurrence of an error, etc. while demultiplexing the main packet stream. While not shown in FIG. 4, the occurrence of an error in the reception of the main packet stream may be checked by using the main packet stream sequence information included in the main packet stream. A main packet stream retransmission request for requesting the retransmission of the substream packet in which the reception error occurs is generated according to the reception error checking result. The generated main packet stream retransmission request is transmitted to the transmission apparatus and is used in the retransmission of the corresponding packet.

Also, there may be a case in which retransmission of a substream packet is necessary due to the occurrence of an error, etc. while depacketing the substream packets. While not shown in FIG. 4, the occurrence of an error in the reception of the substream packet may be checked using the substream sequence information included in the substream packet. A substream packet retransmission request for requesting the retransmission of the substream packet in which the reception error occurs is generated according to the reception error checking result. The generated substream packet retransmission request is transmitted to the transmission apparatus and is used in the retransmission of the corresponding packet.

Hereafter, the packet stream transmission and reception apparatuses according to the present invention will be described in detail through concrete examples.

Figure 5:
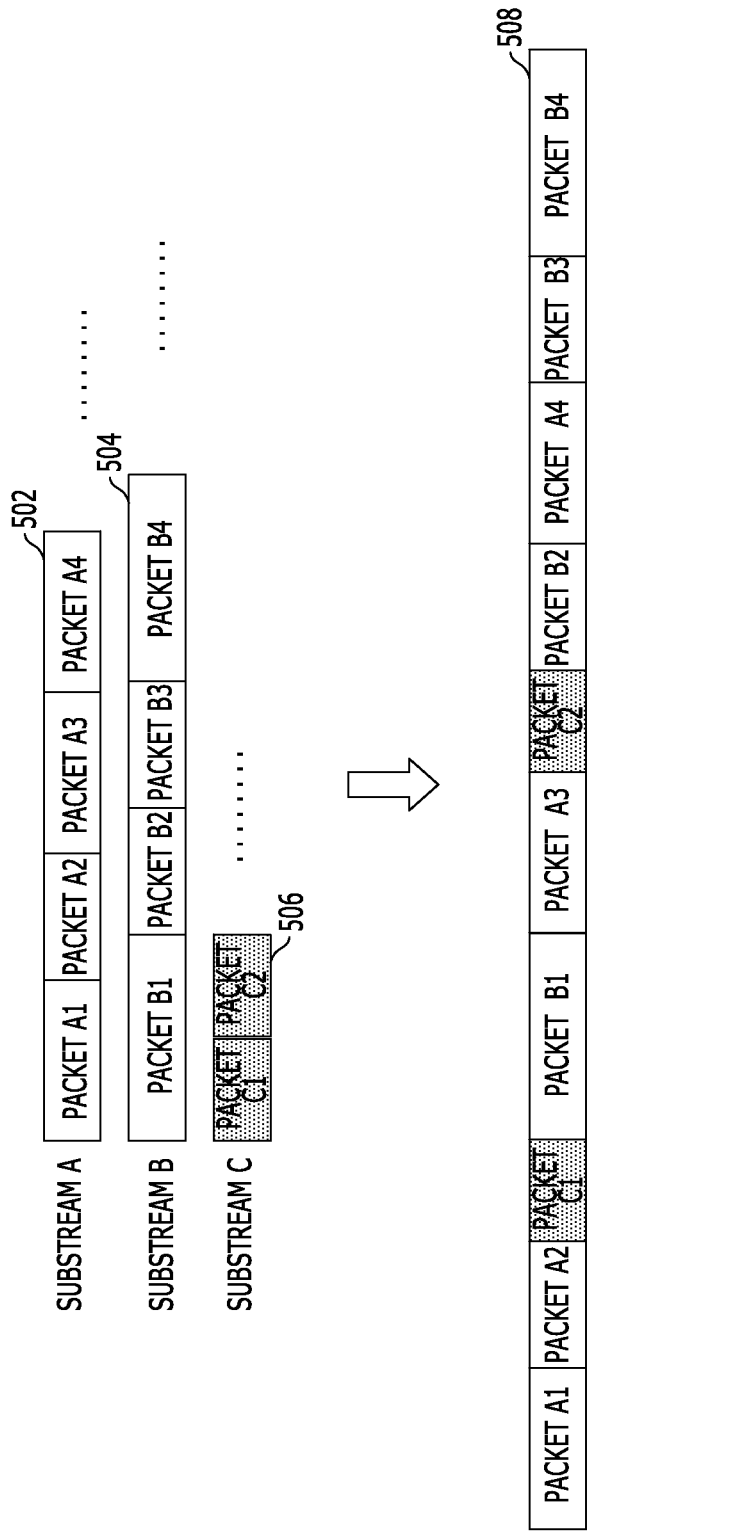
FIG. 5 is a diagram showing an example in which a plurality of substreams are multiplexed into one packet stream in a general IP network which is configured by an IP address/port number pair.

FIG. 5 is a diagram showing an example in which a plurality of substreams are multiplexed into one packet stream in a general IP network which is configured by an IP address/port number pair.

Referring to FIG. 5, each of a substream A 502, a substream B 504 and a substream C 506 is constituted by a row of packets with different sizes. In order to transmit the substreams, the packets included in each substream are multiplexed at a transmitting end, and a multiplexed packet stream 508 is generated. When this packet stream 508 is generated, since the respective substreams 502, 504 and 506 do not recognize times for which the other substreams generate substream packets, they transmit independently of one another their substream packets to a transmission channel with a given IP address/port number.

Therefore, the multiplexed packet stream 508 is multiplexed according to a sequence in which the respective substreams 502, 504 and 506 transmit the substream packets. At this time, the sequence of the respective substreams 502, 504 and 506 may include all optional combinations.

Figure 6:
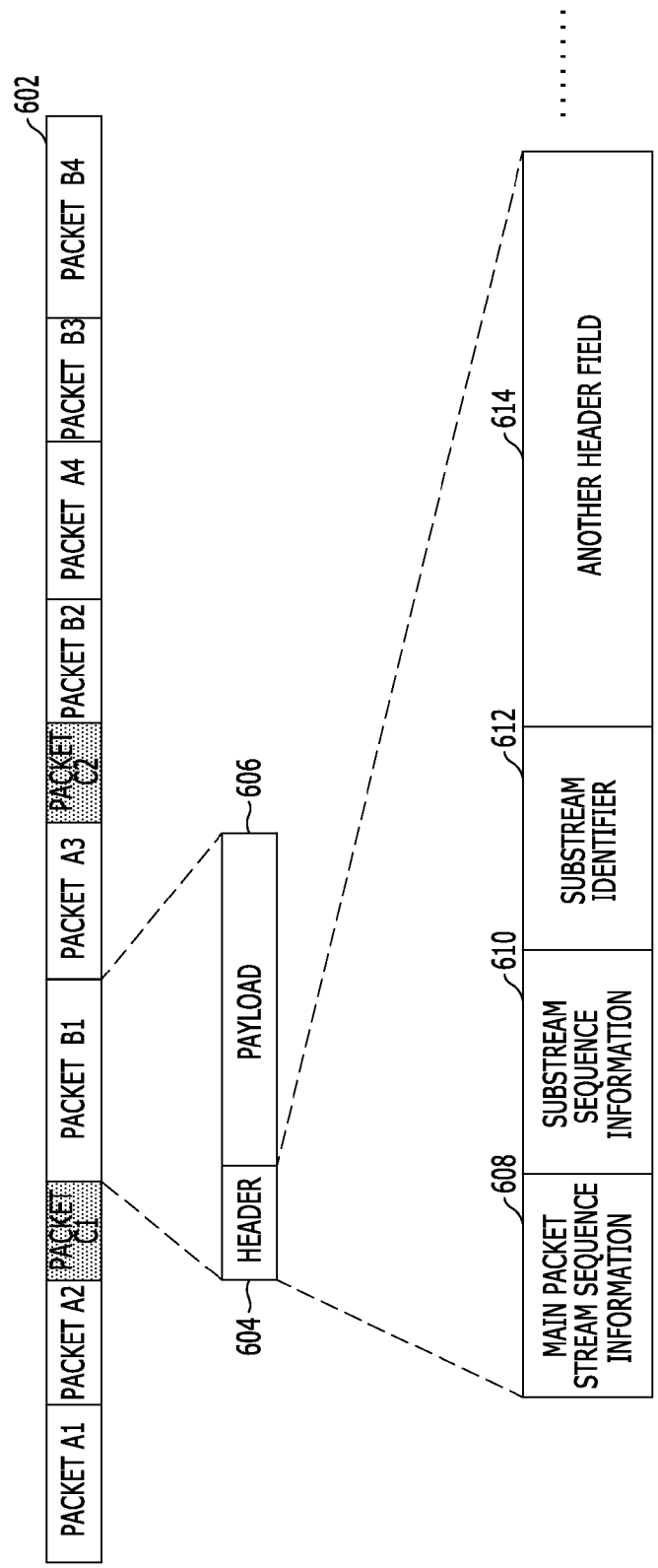
FIG. 6 is a diagram showing the configuration of a multiplexed packet stream in accordance with an exemplary embodiment of the present invention.

FIG. 6 is a diagram showing the configuration of a multiplexed packet stream in accordance with an exemplary embodiment of the present invention.

A packet stream 602 shown in FIG. 6 is a stream which is generated by multiplexing the substreams A, B and C shown in FIG. 5. Each packet constituting the packet stream 602 includes a header 604 and a payload 606. The header 604 includes main packet stream sequence information 608, substream sequence information 610, a substream identifier 612, and another header field 614.

The main packet stream sequence information 608 is information indicating an order of a corresponding packet in the entire packet stream 602. The substream sequence information 610 is information indicating an order of a corresponding packet in each of the substreams 502, 504 and 506. The substream identifier 612 is an identifier indicating that a corresponding packet is a packet of which substream among the plurality of substreams 502, 504 and 506.

According to the present invention, if an error occurs while receiving a packet stream and packet retransmission is required, the reception error may be efficiently dealt with by using the main packet stream sequence information 608, the substream sequence information 610 and the substream identifier 612. Also, according to the present invention, recovery of substreams at different levels is made possible by using the main packet stream sequence information 608, the substream sequence information 610 and the substream identifier 612.

Figure 7:
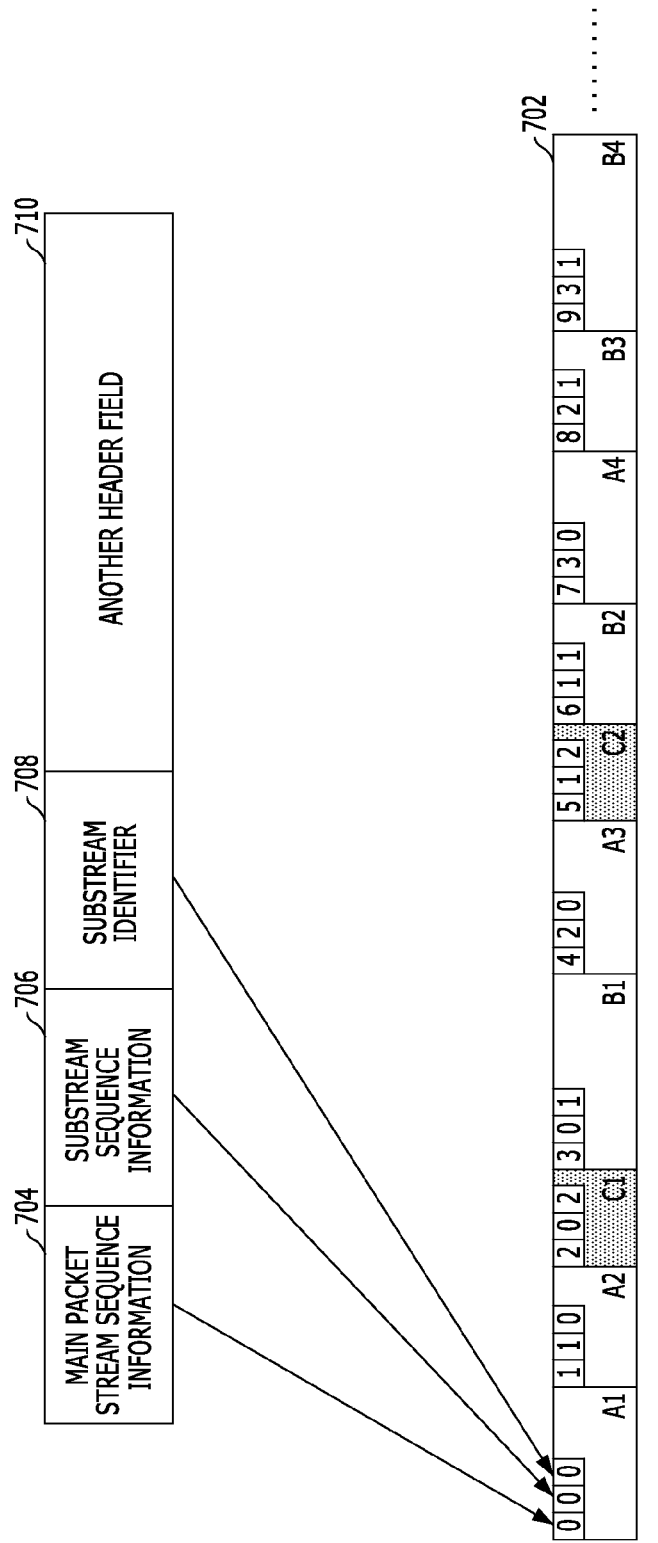
FIG. 7 is a diagram showing an example of actually configuring a packet stream in accordance with another exemplary embodiment of the present invention.

FIG. 7 is a diagram showing an example of actually configuring a packet stream in accordance with another exemplary embodiment of the present invention.

In FIG. 7, main packet stream sequence information 704, substream sequence information 706 and a substream identifier 708 included in the header of each packet are presented on the left upper part of each packet.

First, observing main packet stream sequence information, it is to be appreciated that main packet stream sequence information increases by 1 starting from 0 according to a sequence in which respective packets are received, that is, the sequence of packets A1, A2, C1, B1, . . . , when multiplexing a main packet stream 702. For example, since a packet B1 is inputted fourth, the main packet stream sequence information of the packet B1 becomes 3.

Substream sequence information as a second field has a value that increases by 1 starting from 0 according to a sequence in which corresponding packets are arranged in each substream. For example, since the packet A2 is a second packet of a substream A, the substream sequence information of the packet A2 becomes 1. Also, since a packet B3 is a third packet of a substream B, the substream sequence information of the packet B3 becomes 2.

A substream identifier as a third field includes information indicating that a corresponding packet belongs to a which substream. In an exemplary embodiment of the present invention, the substream A has a substream identifier of 0, the substream B has a substream identifier of 1, and a substream C has a substream identifier of 2. Therefore, the respective packets included in the main packet stream 702 have their respective substream identifiers. For example, the substream identifier of a packet A3 is 0.

Figure 8:
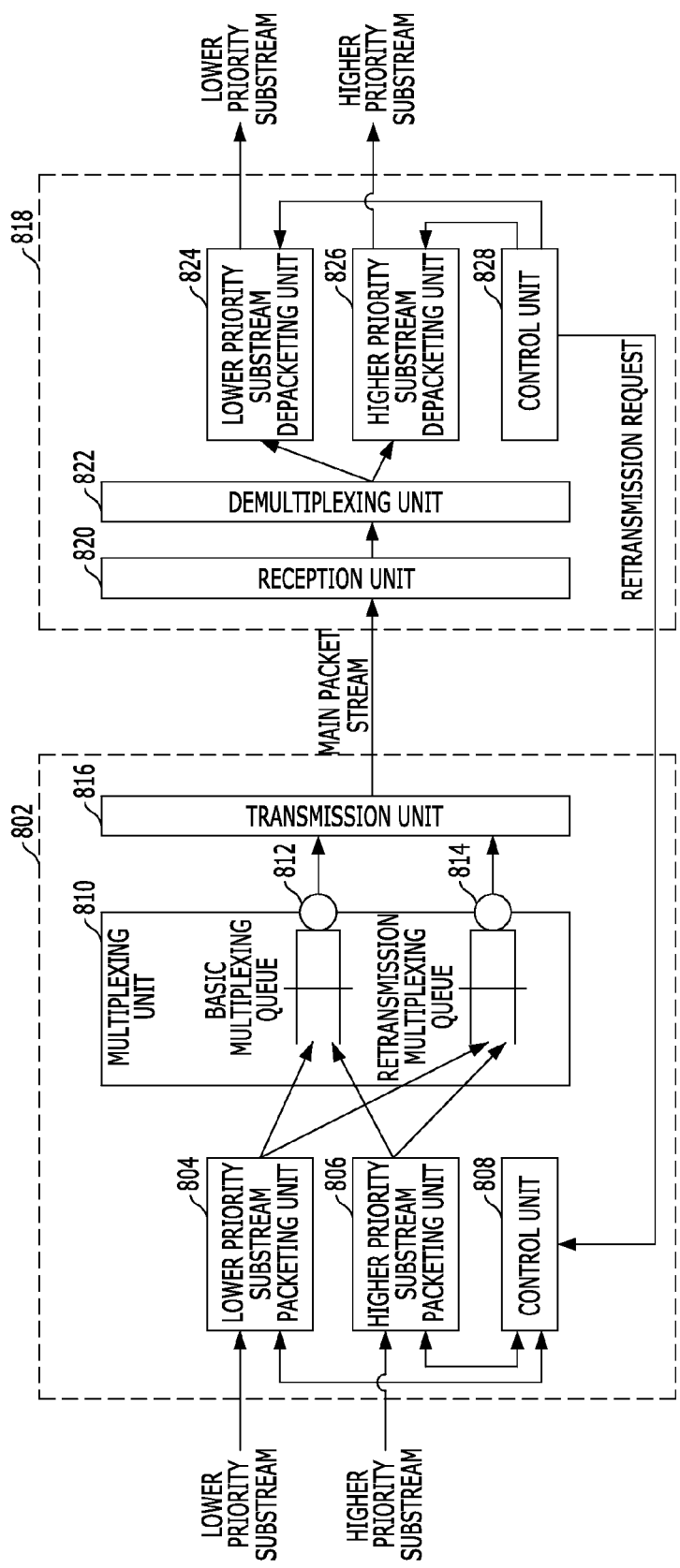
FIG. 8 is a diagram showing the configurations of transmission and reception apparatuses in accordance with another embodiment of the present invention.

FIG. 8 is a diagram showing the configurations of transmission and reception apparatuses in accordance with another embodiment of the present invention.

A transmission apparatus 802 includes a lower priority substream packeting unit 804, a higher priority substream packeting unit 806, a control unit 808, a multiplexing unit 810, a basic multiplexing queue 812, a retransmission multiplexing queue 814, and a transmission unit 816. A reception apparatus 818 includes a reception unit 820, a demultiplexing unit 822, a lower priority substream depacketing unit 824, a higher priority substream depacketing unit 826, and a control unit 828.

In the present embodiment of the invention, the transmission apparatus 802 multiplexes a lower priority substream and a higher priority substream which share a single transmission channel (here, the single transmission channel may include all kinds of packet transmission channels for transmitting and receiving a packet stream, such as a single IP address/port number pair in an IP network), into one main packet stream, and transmits the main packet stream. The reception apparatus 818 demultiplexes the received main packet stream and generates the lower priority substream and the higher priority substream.

The lower priority substream means a substream in which packet loss of a predetermined level is allowed, such as a video substream. The higher priority substream means a substream in which packet loss is not allowed, such as a signaling data substream.

The lower priority substream packeting unit 804 receives a lower priority substream, packets the lower priority substream, and generates lower priority substream packets. Further, the lower priority substream packeting unit 804 allocates lower priority substream sequence information to the lower priority substream packets according to a sequence in which the lower priority substream packets are generated.

The higher priority substream packeting unit 806 receives a higher priority substream, packets the higher priority substream, and generates higher priority substream packets. Further, the higher priority substream packeting unit 806 allocates higher priority substream sequence information to the higher priority substream packets according to a sequence in which the higher priority substream packets are generated.

The lower priority substream packeting unit 804 and the higher priority substream packeting unit 806 may allocate substream identifiers to the respective generated substream packets.

While the lower priority substream packeting unit 804 and the higher priority substream packeting unit 806 are separately shown in FIG. 8, the lower priority substream or the higher priority substream may be packeted through one packeting unit in another embodiment of the present invention. Also, in another embodiment of the present invention, a plurality of lower priority substream packeting units and a plurality of higher priority substream packeting units may exist in the transmission apparatus 802. Similarly, one depacketing unit or a plurality of lower priority substream depacketing units and a plurality of higher priority substream depacketing units may exist in the reception apparatus 818.

The substream packets generated by the lower priority substream packeting unit 804 and the higher priority substream packeting unit 806 are inputted to a basic multiplexing queue 812 included in the multiplexing unit 810. The multiplexing unit 810 allocates main packet stream sequence information to the lower priority substream packets or the higher priority substream packets according to a sequence in which the lower priority substream packets or the higher priority substream packets are inputted. Then, the multiplexing unit 810 multiplexes the lower priority substream packets or the higher priority substream packets and generates a main packet stream.

The main packet stream generated by the multiplexing unit 810 is transmitted to the reception apparatus 818 through the transmission unit 816.

The reception unit 820 receives the main packet stream transmitted through the transmission unit 816. The received main packet stream is transferred to the demultiplexing unit 822. The demultiplexing unit 822 demultiplexes the main packet stream using the main packet stream sequence information included in the main packet stream and generates the lower priority substream packets or the higher priority substream packets. The demultiplexing unit 822 may determine to which substreams the generated substream packets belong, by using the substream identifiers included in the main packet stream.

While the demultiplexing unit 822 demultiplexes the main packet stream, the reception apparatus 818 checks whether all the packets are properly received, by using the main packet stream sequence information included in the respective substream packets, and may request packet retransmission to the transmission apparatus 802 when an error occurs. For example, if the main packet stream sequence information of a packet multiplexed after a packet with main packet stream sequence information of 3 is 5, it may be determined that an error has occurred in the transmission of a packet between both the packets. Then, the reception apparatus 818 transmits a packet retransmission request to the transmission apparatus 802 through the control unit 828.

The control unit 808 of the transmission apparatus 802 having received the packet retransmission request controls retransmission of a packet in which an error has occurred. For example, the control unit 808 requests retransmission of the packet in which the error has occurred, to the lower priority substream packeting unit 804 or the higher priority substream packeting unit 806, and the lower priority substream packeting unit 804 or the higher priority substream packeting unit 806 transfers the packet in which the error has occurred, to the retransmission multiplexing queue 814, by which packet retransmission is implemented.

The lower priority substream depacketing unit 824 depackets the lower priority substream packets using the lower priority substream sequence information included in the lower priority substream packets transferred from the demultiplexing unit 822, and generates the lower priority substream.

Also, the higher priority substream depacketing unit 826 depackets the higher priority substream packets using the higher priority substream sequence information included in the higher priority substream packets transferred from the demultiplexing unit 822, and generates the higher priority substream.

Meanwhile, as aforementioned above, unlike a lower priority substream, in a higher priority substream, an error should not occur in a packet constituting the higher priority substream. Thus, when depacketing the higher priority substream packets, the control unit 828 of the reception apparatus 818 may check if a packet error occurs, using the substream sequence information included in the higher priority substream packets, and as the occasion demands, may transmit a packet retransmission request to the transmission apparatus 802. A packet retransmission process after the packet retransmission request is transmitted to the transmission apparatus 802 is similar as described above.

FIG. 9 is a flow chart showing a method for transmitting a main packet stream in accordance with another embodiment of the present invention.

First, a lower priority substream is packeted, and lower priority substream packets are generated (902). According to a sequence in which the lower priority substream packets are generated, lower priority substream sequence information is allocated to the lower priority substream packets (904).

A higher priority substream is packeted, and higher priority substream packets are generated (906). According to a sequence in which the higher priority substream packets are generated, higher priority substream sequence information is allocated to the higher priority substream packets (908).

Then, according to a sequence in which the lower priority substream packets or the higher priority substream packets are inputted, main packet stream sequence information is allocated to the lower priority substream packets or the higher priority substream packets (910). By multiplexing the lower priority substream packets or the higher priority substream packets, a main packet stream is generated (912). The generated main packet stream is transmitted (914).

After the main packet stream is transmitted, retransmission of the main packet stream is controlled using at least one of lower priority substream sequence information, higher priority substream sequence information and the main packet stream sequence information (916).

FIG. 10 is a flow chart showing a method for receiving a main packet stream in accordance with another embodiment of the present invention.

First, a main packet stream is received (1002). By demultiplexing the main packet stream using the main packet stream sequence information included in the received main packet stream, lower priority substream packets or higher substream packets are generated (1004).

Then, by depacketing the lower priority substream packets using the lower priority substream sequence information included in the lower priority substream packets, a lower substream is generated (1006). By depacketing the higher priority substream packets using the higher priority substream sequence information included in the higher priority substream packets, a higher substream is generated (1008).

Finally, retransmission of the main packet stream is requested using at least one of the lower priority substream sequence information, the higher priority substream sequence information and the main packet stream sequence information (1010).

In accordance with the exemplary embodiments of the present invention, advantages are provided in that differentiated error correction functions for respective substreams included in a multi-packet stream can be realized when transmitting and receiving the multi-packet stream through a single transmission channel.

While the present invention has been described with respect to the specific embodiments, it will be apparent to those skilled in the art that various changes and modifications may be made without departing from the spirit and scope of the invention as defined in the following claims.

What is claimed is:

1. A method for transmitting a main packet stream generated by multiplexing a plurality of substreams, using a single transmission channel, comprising:
    packeting each of the plurality of substreams and generating substream packets;
    allocating substream sequence information to the substream packets according to a sequence in which the substream packets are generated;
    allocating main packet stream sequence information to the substream packets according to a sequence in which the substream packets are inputted;
    multiplexing inputted substream packets and generating the main packet stream, and
    allocating main packet stream sequence information, substream sequence information, and a substream identifier for each header of each packet included in the main packet stream,
    wherein the main packet stream sequence information includes information indicating an order of a corresponding packet in an entire packet stream,
    wherein the substream sequence information includes information indicating an order of a corresponding packet in each substream, and
    wherein the substream identifier includes information indicating that a corresponding packet is a packet of which substream among a plurality of substreams.

2. The method of claim 1, further comprising:
    transmitting the main packet stream using the single transmission channel.

3. The method of claim 1, further comprising:
    receiving a substream retransmission request including substream sequence information of a substream packet requiring retransmission;
    requesting multiplexing of a substream packet corresponding to the substream sequence information of the substream packet requiring retransmission; and
    multiplexing the substream packet corresponding to the substream sequence information of the substream packet requiring retransmission.

4. The method of claim 1, further comprising:
    receiving a main packet stream retransmission request including main packet stream sequence information of a substream packet requiring retransmission;
    requesting multiplexing of a substream packet corresponding to the main packet stream sequence information of the substream packet requiring retransmission; and
    multiplexing the substream packet corresponding to the main packet stream sequence information of the substream packet requiring retransmission.

5. The method of claim 1, further comprising:
    allocating substream identifiers for differentiating the plurality of substreams, to the substream packets.

6. A method for receiving a main packet stream generated by multiplexing a plurality of substreams, using a single transmission channel, comprising:
    receiving the main packet stream;
    demultiplexing the main packet stream using substream identifiers included in the main packet stream, and generating substream packets; and
    depacketing the substream packets using substream sequence information included in the main packet stream, and generating the plurality of substreams,
    wherein the substream sequence information is allocated to the substream packets according to a sequence in which the substream packets are generated,
    wherein the step of receiving the main packet stream includes receiving main packet stream sequence information, substream sequence information, and a substream identifier for each header of each packet included in the main packet stream,
    wherein the main packet stream sequence information includes information indicating an order of a corresponding packet in an entire packet stream,
    wherein the substream sequence information includes information indicating an order of a corresponding packet in each substream, and
    wherein the substream identifier includes information indicating that a corresponding packet is a packet of which substream among a plurality of substreams.

7. The method of claim 6, further comprising:
    checking a reception error in the main packet stream using main packet stream sequence information included in the main packet stream; and
    generating a main packet stream retransmission request according to a reception error checking result.

8. The method of claim 6, further comprising:
    checking a reception error in the substream packets using substream sequence information included in the main packet stream; and
    generating a substream retransmission request according to a reception error checking result.

9. An apparatus for transmitting a main packet stream generated by multiplexing a plurality of substreams, using a single transmission channel, comprising:
    a packeting unit configured to packet each of the plurality of substreams, generate substream packets, and allocate substream sequence information to the substream packets according to a sequence in which the substream packets are generated; and
    a multiplexing unit configured to allocate main packet stream sequence information to the substream packets according to a sequence in which the substream packets are inputted, multiplex inputted substream packets, and generate the main packet stream;
    wherein the packeting unit is configured to allocate main packet stream sequence information, substream sequence information, and a substream identifier for each header of each packet included in the main packet stream, wherein the main packet stream sequence information includes information indicating an order of a corresponding packet in an entire packet stream, wherein the substream sequence information includes information indicating an order of a corresponding packet in each substream, and wherein the substream identifier includes information indicating that a corresponding packet is a packet of which substream among a plurality of substreams.

10. The apparatus of claim 9, further comprising:
a transmission unit configured to transmit the main packet stream using a single transmission channel.

11. The apparatus of claim 9, further comprising:
a control unit configured to receive a substream retransmission request including substream sequence information of a substream packet requiring retransmission, and request multiplexing of a substream packet corresponding to the substream sequence information of the substream packet requiring retransmission, wherein the multiplexing unit multiplexes the substream packet corresponding to the substream sequence information of the substream packet requiring retransmission.

12. The apparatus of claim 9, further comprising:
a control unit configured to receive a main packet stream retransmission request including main packet stream sequence information of a substream packet requiring retransmission, and request multiplexing of a substream packet corresponding to the main packet stream sequence information of the substream packet requiring retransmission, wherein the multiplexing unit multiplexes the substream packet corresponding to the main packet stream sequence information of the substream packet requiring retransmission.

13. The apparatus of claim 9, wherein the packeting unit allocates substream identifiers for differentiating the plurality of substreams, to the substream packets.

14. An apparatus for receiving a main packet stream generated by multiplexing a plurality of substreams, using a single transmission channel, comprising:
an input unit configured to receive the main packet stream;
a demultiplexing unit configured to demultiplex the main packet stream using substream identifiers included in the main packet stream, and generate substream packets; and
a depacketing unit configured to depacket the substream packets using substream sequence information included in the main packet stream, and generate the plurality of substreams, wherein the substream sequence information is allocated to the substream packets according to a sequence in which the substream packets are generated, wherein the input unit configured to receive the main packet stream is also configured to receive main packet stream sequence information, substream sequence information, and a substream identifier for each header of each packet included in the main packet stream, wherein the main packet stream sequence information includes information indicating an order of a corresponding packet in an entire packet stream, wherein the substream sequence information includes information indicating an order of a corresponding packet in each substream, and wherein the substream identifier includes information indicating that a corresponding packet is a packet of which substream among a plurality of substreams.

15. The apparatus of claim 14, further comprising:
a control unit configured to check a reception error in the main packet stream using main packet stream sequence information included in the main packet stream, and generate a main packet stream retransmission request according to a reception error checking result.

16. The apparatus of claim 14, further comprising:
a control unit configured to check a reception error in the main packet stream using substream sequence information included in the main packet stream, and generate a substream retransmission request according to a reception error checking result.

17. A method for transmitting a main packet stream, comprising:
packeting a lower priority substream and generating lower priority substream packets;
allocating lower priority substream sequence information to the lower priority substream packets according to a sequence in which the lower priority substream packets are generated;
packeting a higher priority substream and generating higher priority substream packets;
allocating higher priority substream sequence information to the higher priority substream packets according to a sequence in which the higher priority substream packets are generated;
allocating main packet stream sequence information to the lower priority substream packets or the higher priority substream packets according to a sequence in which the lower priority substream packets or the higher priority substream packets are inputted;
multiplexing the lower priority substream packets or the higher priority substream packets and generating a main packet stream;
transmitting the main packet stream;
controlling retransmission of the main packet stream using at least one of the lower priority substream sequence information, the higher priority substream sequence information and the main packet stream sequence information; and
allocating main packet stream sequence information, substream sequence information, and a substream identifier for each header of each packet included in the main packet stream, wherein the main packet stream sequence information includes information indicating an order of a corresponding packet in an entire packet stream, wherein the substream sequence information includes information indicating an order of a corresponding packet in each substream, and wherein the substream identifier includes information indicating that a corresponding packet is a packet of which substream among a plurality of substreams.

18. A method for receiving a main packet stream, comprising:
receiving a main packet stream;
demultiplexing the main packet stream using main packet stream sequence information included in the main packet stream, and generating lower priority substream packets or higher priority substream packets;
depacketing the lower priority substream packets using lower priority substream sequence information included in the lower priority substream packets, and generating a lower priority substream;

depacketing the higher priority substream packets using higher priority substream sequence information included in the higher priority substream packets, and generating a higher priority substream; and requesting retransmission of the main packet stream using at least one of the lower priority substream sequence information, the higher priority substream sequence information and the main packet stream sequence information, wherein the lower priority substream sequence information is allocated to the lower priority substream packets according to a sequence in which the lower priority substream packets are generated, wherein the step of receiving the main packet stream includes receiving main packet stream sequence information, substream sequence information, and a substream identifier for each header of each packet included in the main packet stream, wherein the main packet stream sequence information includes information indicating an order of a corresponding packet in an entire packet stream, wherein the substream sequence information includes information indicating an order of a corresponding packet in each substream, and wherein the substream identifier includes information indicating that a corresponding packet is a packet of which substream among a plurality of substreams.

19. An apparatus for transmitting a main packet stream, comprising:
a lower priority substream packeting unit configured to packet a lower priority substream and generate lower priority substream packets, and allocate lower priority substream sequence information to the lower priority substream packets according to a sequence in which the lower priority substream packets are generated;
a higher priority substream packeting unit configured to packet a higher priority substream and generate higher priority substream packets, and allocate higher priority substream sequence information to the higher priority substream packets according to a sequence in which the higher priority substream packets are generated;
a multiplexing unit configured to allocate main packet stream sequence information to the lower priority substream packets or the higher priority substream packets according to a sequence in which the lower priority substream packets or the higher priority substream packets are inputted, and multiplex the lower priority substream packets or the higher priority substream packets and generate a main packet stream; and
a transmission unit configured to transmit the main packet stream; and
a control unit configured to control retransmission of the main packet stream using at least one of the lower priority substream sequence information, the higher priority substream sequence information and the main packet stream sequence information,
wherein the transmission unit configured to transmit the main packet stream is also configured to transmit main packet stream sequence information, substream sequence information, and a substream identifier for each header of each packet included in the main packet stream,
wherein the main packet stream sequence information includes information indicating an order of a corresponding packet in an entire packet stream,
wherein the substream sequence information includes information indicating an order of a corresponding packet in each substream, and
wherein the substream identifier includes information indicating that a corresponding packet is a packet of which substream among a plurality of substreams.

20. An apparatus for receiving a main packet stream, comprising:
a reception unit configured to receive a main packet stream;
a demultiplexing unit configured to demultiplex the main packet stream using main packet stream sequence information included in the main packet stream, and generate lower priority substream packets or higher priority substream packets;
a lower priority substream depacketing unit configured to depacket the lower priority substream packets using lower priority substream sequence information included in the lower priority substream packets, and generate a lower priority substream;
a higher priority substream depacketing unit configured to depacket the higher priority substream packets using higher priority substream sequence information included in the higher priority substream packets, and generate a higher priority substream; and
a control unit configured to request retransmission of the main packet stream using at least one of the lower priority substream sequence information, the higher priority substream sequence information and the main packet stream sequence information,
wherein the lower priority substream sequence information is allocated to the lower priority substream packets according to a sequence in which the lower priority substream packets are generated,
wherein the reception unit configured to receive a main packet stream is also configured for receiving main packet stream sequence information, substream sequence information, and a substream identifier for each header of each packet included in the main packet stream,
wherein the main packet stream sequence information includes information indicating an order of a corresponding packet in an entire packet stream,
wherein the substream sequence information includes information indicating an order of a corresponding packet in each substream, and
wherein the substream identifier includes information indicating that a corresponding packet is a packet of which substream among a plurality of substreams.

* * * * *